(12) United States Patent
Bauer-Plank et al.

(10) Patent No.: US 6,517,884 B1
(45) Date of Patent: Feb. 11, 2003

(54) WATER AND OIL CONTAINING EMULSION

(75) Inventors: Christina Bauer-Plank, Vlaardingen; Ton Van Den Berg, Rotterdam, both of (NL); Frank Van Dieren, Valladolid (ES); Juergen Heinz Fabian; Isabella Christina De Vries, both of Vlaardingen (NL)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 158 days.

(21) Appl. No.: 09/712,560

(22) Filed: Nov. 14, 2000

(30) Foreign Application Priority Data

Nov. 15, 1999 (EP) ............................................. 99203816

(51) Int. Cl.$^7$ ................................................. A23D 9/00
(52) U.S. Cl. ...................... 426/604; 426/662; 426/811; 106/243; 106/244; 554/79; 554/80
(58) Field of Search ................................ 426/662, 602, 426/604, 601, 603, 811; 106/243, 244, 38.24, 38.7

(56) References Cited

U.S. PATENT DOCUMENTS

| | | | | |
|---|---|---|---|---|
| 3,796,815 A | * | 3/1974 | Liucklaen | 426/604 |
| 4,119,564 A | * | 10/1978 | Van Dam | 426/605 |
| 4,142,003 A | * | 2/1979 | Sejpal | 426/601 |
| 4,164,594 A | * | 8/1979 | Jackson et al. | 426/662 |
| 4,188,410 A | * | 2/1980 | Rispoli et al. | 426/296 |
| 4,188,412 A | * | 2/1980 | Sejpal | 426/609 |
| 4,325,980 A | * | 4/1982 | Rek et al. | 426/604 |
| 4,330,566 A | * | 5/1982 | Meyer et al. | 426/293 |
| 4,399,165 A | * | 8/1983 | Tack et al. | 426/606 |
| 4,446,165 A | | 5/1984 | Roberts | |
| 4,547,387 A | * | 10/1985 | Todt et al. | 426/602 |
| 4,650,690 A | * | 3/1987 | Bams | 426/602 |
| 4,943,389 A | * | 7/1990 | Weete et al. | 426/662 |
| 4,957,768 A | * | 9/1990 | Dutilh | 426/52 |
| 5,008,037 A | * | 4/1991 | Weete et al. | 426/662 |
| 5,079,028 A | * | 1/1992 | Wieske et al. | 426/425 |
| 5,196,226 A | * | 3/1993 | Sakka et al. | 426/564 |
| 5,397,592 A | * | 3/1995 | Vermaas et al. | 426/604 |
| 5,543,169 A | * | 8/1996 | Colarow et al. | 426/331 |
| 5,567,456 A | * | 10/1996 | Clapp et al. | 426/116 |
| 5,637,337 A | * | 6/1997 | Ueda et al. | 426/329 |
| 5,738,891 A | * | 4/1998 | Andreae et al. | 426/113 |
| 5,756,142 A | | 5/1998 | Reckweg et al. | |
| 5,897,905 A | * | 4/1999 | Bialek et al. | 426/601 |
| 5,945,149 A | * | 8/1999 | Andreae et al. | 426/399 |
| 6,060,107 A | * | 5/2000 | Reddy | 426/601 |
| 6,113,970 A | * | 9/2000 | Rainey et al. | 106/243 |

FOREIGN PATENT DOCUMENTS

| | | |
|---|---|---|
| EP | 253 429 | 1/1988 |
| EP | 285 198 | 10/1988 |
| EP | 422 712 | 4/1991 |
| GB | 952 848 | 3/1964 |
| GB | 1 333 938 | 10/1973 |
| NL | 7112119 | 3/1972 |
| WO | 97/14318 | 4/1997 |

OTHER PUBLICATIONS

International Search Report dated Mar. 15, 2001.
European Search Report dated Apr. 4, 2000.

* cited by examiner

Primary Examiner—Carolyn Paden
(74) Attorney, Agent, or Firm—Gerard J. McGowan, Jr.

(57) ABSTRACT

The invention relates to a food product comprising 0.1 to 1.5 wt % of one or more anti-spattering agents comprising no native soy lecithin or native soy lecithin in an amount of from 0 to 0.05 wt % on total product, whereby the anti-spattering agent is preferably selected from the group comprising hydrolyzed lecithin, fractionated lecithin, citric acid esters or combinations thereof; optionally one or more emulsifiers in a total amount of from 0 to 0.5 wt %; optionally one or more browning agents in a total amount of from 0 to 0.07 wt %; one or more salts in an amount of from 0.5 to 3 wt %.

9 Claims, No Drawings

WATER AND OIL CONTAINING EMULSION

The present invention relates to a food product which is a water and oil containing emulsion which comprises an anti-spattering agent. The emulsions are pourable or squeezable products as evidenced by a Bostwick value of equal to or more than 7, preferably more than 10 at 15° C. Preferred food products are water in oil emulsions.

BACKGROUND OF THE INVENTION

Pourable or squeezable food products of a water phase and a fat phase are for example known as liquid frying products which are pourable or squeezable water in oil emulsions at ambient temperature.

These products are for example used in shallow frying. Pourable and squeezable products are considered to be more easily dosed than plastic products for example packed in a wrapper or a tub, and are therefore desired frying products.

The pourability or squeezability of these products is evidenced by a Bostwick value of at least 7 at 15° C. For pourable products, a Bostwick value of at least 9 is preferred, even more preferred is a Bostwick value of at least 15, most preferred from 15 to 23.

The method to determine this value is illustrated in the examples.

The invention especially relates to pourable or squeezable water in oil emulsions.

The physical storage stability of pourable or squeezable products is considered an important characteristic.

For example squeezable or pourable emulsions may show formation of an oil layer on top of the emulsion after storage at temperatures between 5 and 25° C. The formation of such an oil layer is referred to as oil separation. Pourable products such as liquid frying products preferably show oil separation of less than 7 vol %, more preferred less than 5 vol %, on total product after storage at 25° C. for 4 weeks.

As many known water in oil emulsions are often used for frying of food stuff these products usually comprise an anti-spattering agent. Anti-spattering agents are often included in frying products like margarines to improve uniform release of water during heating.

Spattering of a water in oil emulsion is believed to be caused by superheating of water droplets. At a certain point after heating the water droplets explosively evaporate, whereby the product can be spread all over the surroundings of a frying pan in which the emulsion is heated. This may cause danger to the person who fries foodstuff in the heated emulsion and it also often causes a mess in the kitchen.

For example lecithin, especially the phosphatidylcholine component of lecithin, is a well known anti-spattering agent.

Especially pourable or squeezable water in oil emulsions comprising native lecithin as anti-spattering agent are susceptible to undesired oil separation upon storage.

Therefore a desire exists for pourable/squeezable water in oil emulsions that comprise little or no native lecithin.

A further desired characteristic of water in oil emulsions used for frying is that they show the desired signal function. With signal function is meant that during heating the user of the frying medium desirably gets a specific signal at the moment the frying medium is heated sufficiently to temperatures of about 160 to 190° C., to put the meat or other foodstuff in.

Foaming of the frying medium as caused by heating, may be one element of a signal function. During heating usually a foam slowly develops. This foaming can be described as the formation of a blanket of gas bubbles on top of the melted frying medium, which is easily identified by eye. The amount of foam that exists is expressed in terms of surface coverage, i.e. in percentage of frying medium surface that is covered by the foam.

The moment at which the maximum surface coverage with the foam is reached, is generally perceived by consumers as the moment to put the food stuff that is to be fried in the hot frying medium.

Desirably foaming is such that a foam with small average gas bubble size of about 0.05 to 1.5 cm develops when the product is heated. Preferably this foam covers 80 to 100% of the frying pan surface. Also preferred is that the foam is not fading immediately but lasts at maximum surface coverage for several seconds, preferably about 15 to 30 seconds, to give a user the time to put frying stuff like meat in the hot frying medium.

Moreover there is a desire among a group of consumers for frying products which do not show browning upon heating but which maintain their yellow-gold colour, even at increased temperatures of for example 160 to 190° C.

The colour of a food product, used as a frying medium, can be determined by eye or any other suitable method that is available.

In view of increased awareness among some consumers regarding health and naturalness, these consumers seem to appreciate the maintenance of the yellow colour during frying, in contrast to the often resulting brown or even brown-black colour of many known frying products at increased temperatures.

The increased desire for natural products is also demonstrated by the wish of consumers for food products which are essentially free of additives. Known products like margarine often contain on their packaging material a list of added ingredients such as emulsifiers, flavour components, acidifying agents, stabilisers and the like.

The identification on a product package of these components as additives is often required by national law. In an ingredient list all added ingredients; i.e. those not present naturally in the basic ingredients are summarised. Such law for example exists in Germany, France, The Netherlands.

Ingredients mentioned on this list alert the consumer to the presence of non-natural ingredients. Therefore it is considered that a commercial benefit can be obtained for products that do not have many non-naturally present additives listed on the package.

In summary there is a desire for squeezable or pourable food products which are suitable for shallow frying and which show all the above-indicated characteristics i.e.

a) physical storage stability
  b) low spattering
  c) foaming as a signal function
  d) gold-yellow colour even when heated to high temperatures
  e) as little added ingredients on the package as possible.

The prior art discloses products which fulfil part of these characteristics, however none of the products disclosed in the art relates to products which show all these characteristics.

For example GB-A-1,333,938 discloses that oil separation of a water in oil emulsion can be at least partly overcome by incorporating in the emulsion an emulsion-stabilising amount of gas bubbles. However the disclosed products comprise skim milk and it is taught that the optimum stability is obtained by the addition of emulsifiers. These products are believed to show strong browning upon heating and to be less attractive for certain groups of consumers who do not appreciate products with added emulsifier on the package.

Also the spattering and foaming behaviour of these products is believed to be unsatisfactory as these products do not comprise anti-spattering agents.

NL-A-7112119 relates to pourable margarines which have improved stability against oil separation and comprise phosphatides or derivatives thereof to improve spattering behaviour in frying.

According to the examples and the teaching of the description, emulsifiers such as monoglycerides in an amount of about 0.2 wt %, are added to further increase the stability of these products. Nothing is disclosed about the foaming properties.

U.S. Pat. No. 5,756,142 discloses a squeezable spread comprising lecithin.

EP-A-253,429 relates to a surface active composition comprising phosphatidylcholine and phosphatidylethanolamine and at least 3% lysophosphatidylethanolamine and the phosphatide containing composition is further characterised by a specific degree of hydrolysis. The compositions disclosed in the example comprise 1 wt % whey solids which will lead to considerable, undesired, browning.

Furthermore commercial products are known which comprise Bolec ZT$^{(tm)}$ as anti-spattering agent in amounts of for example 0.35 wt %. This amount of a native soy lecithin was found to lead to products which showed considerable oil separation of about 15%.

The elimination of native soy lecithin such as Bolec ZT$^{(tm)}$ leads to a change in foaming behaviour. Native lecithins like Bolec ZT$^{(tm)}$ give rise to the formation of a desired fine foam with an average gas bubble size of from about 0.05 to about 1.5 cm and with a maximum of bubble size distribution at about 0.4–0.9 cm. Such a small average gas bubble size leads to the formation of white or very pale yellow coloured foam which is appreciated by certain groups of consumers.

Moreover the presence of native lecithin influences the velocity of foam formation whereby foam formation was already obtained within 95 seconds. As a further advantage the foam produced in the presence of native lecithin remains at maximum coverage for a period of at least 15 seconds which gives a consumer the time to put meat or other frying stuff in before the foam has disappeared. Furthermore, it was found that the surface coverage with foam at the end of the shallow frying process remains at least 50% for products containing native lecithin.

The removal or severe reduction in native lecithin content in a food product for frying has the problem that it leads to a different foam behaviour, showing none of the indicated foam properties and signal function as nicely as in the presence of native lecithin such as Bolec ZT$^{(tm)}$.

Other known products comprise Bolec MT$^{(tm)}$, a hydrolysed lecithin, at low salt content of 0.1 wt % or less. These show undesired spattering and comprise high amounts of monoglycerides.

It has now surprisingly been found that products comprising a specific combination of anti-spattering agents, emulsifiers, browning agent, salt and fat show all desired characteristics. These products showed the desired foaming behaviour even in the total absence of native lecithin.

STATEMENT OF INVENTION

Therefore the invention relates to a food product with a Bostwick value of at least 7 at 15° C., comprising an aqueous phase and from 40 to 90 wt % of a fat phase on total product, said food product comprising a) 0.1 to 1.5 wt % of one or more anti-spattering agents comprising no native soy lecithin or native soy lecithin in an amount of from 0 to 0.05 wt % on total product, whereby the anti-spattering agent is preferably selected from the group comprising hydrolysed lecithin, fractionated lecithin, citric acid esters or combinations thereof;

b) optionally one or more emulsifiers in a total amount of from 0 to 0.5 wt % c) optionally one or more browning agents in a total amount of from 0 to 0.07 wt %, preferably 0 to 0.03 wt %.

d) one or more salts in an amount of from 0.5 to 3 wt %.

DETAILED DESCRIPTION OF THE INVENTION

Products according to the invention are products with a Bostwick value of at least 7 at 15° C.

Products with a Bostwick value at 15° C. of below 10 are squeezable products which suffer less from the indicated oil separation compared to pourable products.

Spattering can be measured by determining the spattering value according to the method illustrated in the examples. Preferably food products according to the invention show a primary spattering value, SV1, (spattering upon heating of a frying product such as margarine, without incorporation of a food product to be fried) of from 7 to 10, more preferably from 8.5 to 10. The secondary spattering value, SV2, (spattering upon incorporation of a food product such as meat in a shallow frying product) for products according to the invention is preferably from 5–10.

Preferred anti-spattering agents are selected from the group comprising hydrolysed vegetable lecithin such as Bolec MT$^{(tm)}$, fractionated lecithin such as alcohol soluble lecithin fractions e.g. cetinol™, synthetic anti-spattering agents such as citric acid esters or combinations thereof.

For the purpose of the invention, lecithins, which comprise phosphoacylglycerols, can be divided in three groups according to their preparation. The first group is formed by native lecithins such as Bolec ZT™.

Native lecithins are for example obtained from triglyceride oils which have been filtered, extracted and stripped. The native lecithins can be separated from the oils by use of their affinity for water, this rendering them oil insoluble.

According to another, more preferred definition, native lecithins are those which have a phosphatidylcholine to phosphatidylethanolamine ratio of at most 1.3, in combination with the total amount of lysophosphatides being at most 5 wt % of all phosphatides making up the native lecithin composition.

The second group of lecithins is formed by (partly) hydrolysed lecithins which originate from native lecithins which have been hydrolysed for example by use of the enzyme phospholipase A or by chemical hydrolysis. Hydrolysed lecithins can also be prepared by chemical synthesis.

A third group of lecithins comprises fractionated lecithins such as the alcohol soluble fraction of native lecithins such as cetinol™.

This type of lecithin can be obtained in a process wherein native lecithins are extracted with alcohol.

Examples of these three groups of lecithins are:

native lecithin: Bolec ZT$^{(tm)}$, Adlec$^{(tm)}$, Sterpur PM$^{(tm)}$;

hydrolyzed lecithin BOLEC MT$^{(tm)}$, Sterpur E$^{(tm)}$, Adlec E$^{(tm)}$;

fractionated lecithin: Cetinol$^{(tm)}$, Nathin 3-KE$^{(tm)}$.

For the purpose of the invention lecithins are from vegetable origin.

Lecithins in each group can optionally be de-oiled lecithins.

Suitable amounts of anti-spattering agent were found to range from 0.1 wt % to 1.5 wt %. It will be appreciated that the amount of anti-spattering agent used is dependent on the type of anti-spattering agent used.

Native lecithins such as Bolec ZT™ are well known anti-spattering agents but products comprising this agent show undesired oil separation already at amounts of native soy lecithin of above 0.05 wt %. Therefore the products according to the invention are preferably essentially free of native soy lecithin, although a minor amount of at most 0.05 wt % may be present.

The anti-spattering agents are present in a total amount of from 0.1 wt % to 1.5 wt %. Lower values than 0.1 wt % lead to unsatisfactory spattering behaviour and amounts over 1.5 wt % were found to lead to off taste, coarse foam with high average gas bubble size, and often too much foam which can rise out of the pan.

Preferably the amount of hydrolysed lecithin is carefully chosen between 0.1 and 1 wt % as levels above 1 wt % may lead to taste defects.

Preferably a synthetic anti-spattering agent like citric acid ester is present in an amount of citric acid ester is preferably from 0.1 to 1.5 wt %.

The amount of fractionated lecithin is preferably from 0 to 0.5 wt %, whereby the presence of at least some cetinol is highly preferred.

According to a preferred embodiment, the anti-spattering agent consists of hydrolysed lecithin in an amount of 0.1 to 1 wt %, fractionated lecithin in an amount of 0 to 0.5 wt % and citric acid ester in an amount of 0 to 1.5 wt %.

According to a highly preferred embodiment, the anti-spattering agent consists of 0.1 to 1 wt % hydrolysed lecithin and 0.05 to 0.5 wt % alcohol soluble lecithin.

According to an even more preferred embodiment, the amount of hydrolysed lecithin is from 0.1 to 0.35 wt % and the amount of alcohol soluble lecithin is from 0.05 to 0.2 wt %.

However not all compositions comprising the indicated anti-spattering agents will show the desired foaming behaviour. The addition of these anti-spattering agents to common liquid frying products which are often at least partly based on milk ingredients was found to lead to products which showed a coarse foam with average gas bubble size of between about 0.7 and about 2.5 cm with a maximum from about 1.2 to about 1.8 cm. A coarse foam is a foam with relatively large average gas bubble size of between 0.7 and 2.5 cm wherein also many droplets with size of 1.5–2.5 cm are present. The formation of gas bubbles with such big size is considered undesirable as it does not impart the white look to the product and a yellow view remains. Moreover the large bubbles were found to spatter more severely. Also they are considered less suitable to serve as a signal function.

Furthermore the presence of browning agent such as protein was found to lead to a delay of the start of foaming, a reduction of duration of maximum surface coverage with foam, and a reduction of the foam amount at the end of the shallow frying process.

Browning agents are therefore preferably fully absent but a small amount of up to 0.07 wt % was found to be tolerable. More preferred the amount of browning agent is from 0 to 0.03 wt %.

It will be appreciated that the amount of browning agent such as protein is related to the amount of anti-spattering agent used in view of their combined effect on the formation of a foam.

Besides protein the following compounds are known as browning agents: sugars, combinations of protein and sugar, biopolymers.

In addition to influence on foaming behaviour, the absence or presence of only a low amount of browning agent such as protein was found to lead to products with increased microbiological stability. This is believed to be a considerable advantage; the increase in microbiological stability opens the possibility to reduce or even eliminate preservation agents like potassium sorbate.

The presence of preservation agents is often required to be declared in the ingredient list on the package of a product. The elimination of such ingredients therefore contributes to enhanced perceiving of naturalness by some groups of consumers. This is considered advantageous for commercialisation of a food product in the current age, where many people are considering the presence additives and their amounts while buying food stuff.

To further improve the naturalness of the current products, the product preferably does not comprise an emulsifier other than lecithin or comprises from 0 to 0.5 wt % of an emulsifier other than lecithin. Traditionally emulsifiers are present in spreadable margarines which are traditionally sold in a wrapper or a tub. Emulsifiers are generally believed to effectively increase the stability of an emulsion (Food science and technology, G. Hoffmann, Academic press, 1989, page 147, par A1). Therefore water in oil emulsions, especially those which show a tendency to oil separation, usually comprise emulsifiers to stabilise the emulsions and reduce separation. Examples of emulsifiers are mono- and diglycerides. Combinations thereof are possible.

Also lecithin can function as an emulsifier but for the purpose of the invention the term emulsifier does not include lecithins.

It has now surprisingly been found that emulsifiers (other than lecithin) are no longer needed if products are prepared according to the claimed composition. The specific balance of ingredients thus obtained leads already to products which show no or very limited oil separation. The absence of emulsifiers is considered beneficial in at least two ways. The first benefit being in the cost savings that can be obtained if emulsifiers are no longer added. The second benefit is again in the naturalness of the product, which is increased if no emulsifiers are added. No added emulsifiers means deletion of another item of the common ingredient list for these products.

Although we have found that emulsifiers, other than lecithin, are not necessary and may be fully absent, the presence of a limited amount of emulsifier can be tolerated.

Therefore products according to the invention comprise from 0 to 0.5 wt %, more preferred from 0 to 0.18 wt % of emulsifier. For the purpose of the invention lecithin is not included in this amount.

The potential of our product to show the desired characteristics even in the presence of some emulsifier is beneficial as in almost all cases where oil is used, some partial glycerides like monoglycerides and/or diglycerides will be present. These partial glycerides develop during storage of a triglyceride oil. The level of emulsifier thus obtained is usually below 0.15 wt % so removal is not necessary.

However if the concentration of mono or diglycerides is above 0.5 wt % they are preferably removed from the oil before it is used in product preparation. Undesired effects develop when the amount of emulsifier such as partial glycerides is above 0.5 wt %.

More preferred the amount of emulsifier is from 0 to 0.18 wt %.

The monoglycerides and/or diglycerides which develop during oil storage can be identified by generally known techniques. As these partial glycerides have as a starting source the oil in which they develop, the fatty acid composition of the partial glycerides is similar to that of the stored triglyceride oil.

Emulsifiers that can for example be added are partial glycerides with either saturated and or unsaturated fatty acid chains. Especially the saturated fatty acid partial glycerides are less preferred. It has been found that during temperature cycling of a pourable product the saturated partial glycerides influence the crystallisation behaviour of the fat blend which may influence the pourability of the product. Increased levels of partial glycerides may lead to hardly squeezable products. This effect was especially found if the amount of saturated partial glycerides is above the solubility level of these compounds. The solubility level is generally about 0.1 to 0.2 wt %. Therefore products according to the invention preferably comprise from 0 to 0.2 wt % of partial monoglycerides with saturated fatty acid chains, more preferred the compositions are free of these partial glycerides.

In a preferred embodiment the food products according to the invention are essentially free of added emulsifier. This leads to a shortened ingredient list on the product package in several countries.

For the purpose of the invention added emulsifiers such as mono-or diglycerides are those emulsifiers such as mono-or diglycerides which are added on top of the emulsifiers such as mono- or diglycerides which may be present in the triglyceride oil material.

In an even more preferred embodiment products according to the invention are essentially free of all emulsifier. Again lecithin is not included as this is anyway present to improve spattering behaviour.

Traditionally margarines and like products, and also butter comprise salt. It is generally known that in some countries consumers prefer low salt products (below 0.4 wt %) and in other countries consumers prefer high salt products (above 0.4 wt %).

Known pourable margarines comprise varying amounts of salt, which are tuned to the consumers desires.

It has now been found that the salt level of pourable products which have the indicated balance of ingredients should be between 0.5 to 3, preferably 0.8 to 3 wt % of salt. The salt level was found to influence spattering behaviour. Low salt amounts were found to lead to unsatisfactory spattering behaviour. Preferred levels of salt are from 1 to 2.5 wt %, more preferred from 1.2 to 1.8 wt %.

The salt can for example be selected from potassium salts, sodium salts, choline salts, ammonium salts, calcium salts and combinations thereof. Examples are potassium chloride, sodium chloride, choline choride, and combinations thereof.

The products comprise 40 to 90 wt % of a fat phase. Preferably the total amount of fat phase in products according to the invention is from 50 to 90 wt %, more preferred 55 to 90 wt %, most preferred 65 to 85 wt %.

Besides a fat blend, the fat phase comprises optionally fat soluble ingredients like colourants, vitamins and flavours.

Most known fat blends that are suitable for liquid frying products were found to be suitable for products according to the invention.

The known liquid/squeezable frying products fat blend usually consists of a mixture of an oil, a fat which at ambient temperature is fully liquid, and a fat which is solid at ambient temperature, the so-called hardstock. The ratio of liquid and solid fat is chosen such that after proper processing together with an aqueous phase a product with a suitable squeezable or pourable consistency is obtained.

The presence of hardstock fat in liquid frying products aims to contribute to stabilisation of the emulsion. As explained above unstable liquid frying products show phase separation in the form of oil separation.

The solid fat crystals which are needed for the stability of the emulsion, on the other hand may adversely affect its pourability. Liquid frying products manufacture therefore requires a hardstock fat with properties which are delicately balanced. Any suitable hardstock may be used.

A liquid frying product having a pourability rating (Bostwick value) of less than 7 is too thick and lacks acceptable pourability and squeezability.

Fully hydrogenated high erucic rapeseed oil (shortly denoted as fully hardened rapeseed oil or RPh70) is a well known hardstock fat which complies with the above specification. It is suited for the manufacture of satisfactory liquid or squeezable frying products which combine good stability with good pourability. However also other hardstocks may be used such as sunflower seed oil with a melting point of about 69° C., soy bean oil with a melting point of about 65° C., palm oil with a melting point of about 58° C., arachidic oil with a melting point of about 60° C. and cotton seed oil with a melting point of about 62° C. Combinations of one or more of these hardstock fats or interesterified blends of these fats may also be suitably applied.

Presently, from all above mentioned fats mainly fully hardened rapeseed oil is employed for the commercial preparation of high quality liquid frying products. Its use is described e.g. in U.S. Pat. No. 5,756,142.

Most liquid or squeezable frying products are prepared with 1.5–5 wt. % hardstock fat on total product.

In addition to the hardstock the fat blend comprises a relatively low melting fat.

As the low melting fat an oil rich in triglycerides comprising (poly) unsaturated fatty acid residues is highly preferred.

Therefore the low melting fat is preferably selected from the group comprising sunflower oil, soybean oil, rapeseed oil, cottonseed oil, olive oil, corn oil, groundnut oil, or low melting butterfat fractions and/or combinations thereof. These fats may be partially hydrogenated.

The composition of the fat blend is preferably such that the fat blend shows a solid content of 1 to 3, more preferred 2.5 to 3.0% at 5° C. and 1.5 to 3, more preferred 2.0 to 2.5% at 15° C. and 2 to 3, more preferred 1.5 to 2.0 at 35° C.

In addition to the above mentioned ingredients, food products according to the invention may optionally contain further ingredients suitable for use in these products. Examples of these materials are sweetener materials, EDTA, spices, bulking agents, egg yolk, stabilising agents, flavouring materials, colouring materials, acids, preserving agents, vegetable particles etc.

However the amount of these ingredients should be such that the desired characteristics are not severely drawn back by the presence of these ingredients. Therefore for example the presence of low amounts of flavour components, colouring agents is tolerated. However the presence of sugars or stabilising agents, which are known to cause browning is often less preferred.

Moreover it will be appreciated that all these ingredients when added will be mentioned on the ingredient list, which in many cases may reduce the perceived naturalness of the products.

Advantageously the products according to the invention comprise gas such as nitrogen, carbon dioxide or another, preferably inert gas. It has been found that such gas if present can suitably further stabilise a water in oil emulsion. Preferably however the stability of the product without gas is already acceptable e.g. having an oil separation of below 5 vol % after storage for 4 weeks at 25° C. and fulfilling the other desires indicated above. Optional gas may then be added for further stabilisation.

Generally the balance of compositions according to the invention will be water.

Products according to the invention can be prepared by general methods as known to the person skilled in the art. For example a premix comprising all ingredients is prepared, followed by blending and mixing in order to establish a suitable emulsion. If desired the crystallisation of solid fat if present can either be performed a priory or as a processing step in which the premix is cooled by one or more scraped surface heat exchangers. In such a step also the process of emulsification could take place. Emulsification could on the other hand as well be envisaged by other kinds of techniques as, e.g. membrane emulsification and alike.

If a small amount of hardened fat such as hardened rapeseed oil is present in the final product, a preferred process comprises the steps of melting triglyceride oil in shear mixer such as an A unit, cooling to below the alpha crystallisation temperature and subsequent, or prior to cooling, mixing the triglyceride oil with the aqueous phase.

The resulting product is preferably stored at a temperature from 0 to 15° C.

All concentrations in this specification are weight concentrations unless indicated otherwise.

The invention is illustrated by the following examples.

EXAMPLES

Measuring Oil Separation

A plastic bottle of 500 ml, width: 57 mm, height 160 mm was filled with the sample up to a filling height of 150 mm. After four weeks storage at 25° C. the thickness of the separated oil layer is measured and expressed as vol. % on total sample volume. The vol. % is the rating for emulsion stability.

Measuring Pourability

Pourability or squeezability is measured according to the standard Bostwick protocol. The Bostwick equipment consists of a 125 ml reservoir provided with a outlet near the bottom of a horizontally placed rectangular tub and closed with a vertical barrier. The tub's bottom is provided with a 25 cm measuring scale, extending from the outlet of the reservoir. When equipment and sample both have a temperature of 15° C., the reservoir is filled with 125 ml of the sample after it has been shaken by hand ten times up and down. When the closure of the reservoir is removed the sample flows from the reservoir and spreads over the tub bottom. The path length of the flow is measured after 30 seconds. The value, expressed as cm per 30 seconds is the Bostwick rating, which is used as yard stick for pourability.

The maximum value that can be determined with this measurement is 23.

Determination of Spattering Value

The spattering behaviour of food products according to the invention was evaluated after storage of the products for 1 or 8 days at 5° C.

Primary spattering (SV1) was assessed under standardised conditions in which an aliquot of a food product was heated in a glass dish and the amount of fat spattered onto a sheet of paper held above the dish was assessed after the water content of the food product had been driven off by heating.

Secondary spattering (SV2) was assessed under standardised conditions in which the amount of fat spattered onto a sheet of paper held above the dish is assessed after injection of a quantity of 10 ml water into the dish.

In assessment of both primary and secondary spattering value about 25 g food product was heated in a glass dish on an electric plate to about 205° C. The fat that spattered out of the pan by force of expanding evaporating water droplets was caught on a sheet of paper situated above the pan. The image obtained was compared with a set of standard pictures number 0–10 whereby the number of the best resembling picture was recorded as the spattering value. 10 indicates no spattering and zero indicates very bad spattering. The general indication is as follows.

| Score | Comments |
| --- | --- |
| 10 | excellent |
| 8 | good |
| 6 | passable |
| 4 | unsatisfactory for SV1, almost passable for SV2 |
| 2 | very poor |

Typical results for household margarines (80 wt % fat) are 8 for primary spattering (SV1) and 5 for secondary spattering (SV2) under the conditions of the above mentioned test.

Determination of Foaming

A sample of 25 g of product is heated in a frying pan of stainless steel material and 24 cm diameter. The heating is carried out at a household gas unit of average size at high heat.

Measurements were carried out without inserting meat or other food stuff in the frying medium.

During the heating the following is measured:

Time until foam formation starts (a)

Maximum of bubble size distribution at maximum foam (in mm)(b)

Time that maximum amount of foam is maintained (c)

Quantity of foam at the end of the frying process (d)

All the above values were determined by eye.

Browning

Browning was determined by comparison of the colour of the frying medium to a set of standard pictures.

Example I–V and Comparative Examples

Hardstock is heated to 70° C. and mixed with the remaining part of the fat phase at 55° C.

The fat phase is mixed with all other ingredients at about 55° C. to form a premix, which is treated in a votator process comprising in a first step treatment in an series of A units such that the temperature of the premix is reduced to about 5° C. The A unit surface is about 1 m² for throughput of about 5 ton per hour. In a second step the resulting mixture is treated in a series of C units at about 750–900 rpm. During this treatment the temperature of the mixture rises to about 15° C.

The product is subsequently packaged and stored to about 15° C.

In example II nitrogen gas is injected before packaging using a C unit with nitrogen injection.

TABLE 1 composition ex. I-V in wt % on total product

| Ingredient | I | II | III | IV | V |
|---|---|---|---|---|---|
| Bolec MT (UMZ) | 0.18 | 0.18 | 0.18 | 0.35 | 0.26 |
| Cetinol (UMZ) | 0.1 | 0.1 | 0.1 | | 0.12 |
| Added monoglycerides** | | | 0.1 | | |
| Salt; NaCl | 1.5 | 1.5 | 1.5 | 1.5 | 1.5 |
| Nitrogen gas | | yes | | | |
| Fat phase*** | 82 | 82 | 82 | 82 | 82 |
| Flavour/carotene | 0.032 | 0.032 | 0.032 | 0.032 | 0.03 |
| K-sorbate | 0.073 | 0.073 | 0.073 | 0.073 | 0.073 |
| Citric acid | 0.048 | 0.048 | 0.048 | 0.05 | 0.05 |

Balance to 100 wt % is water.
**Dimodan CPT ex Danisco
***Fat phase for example I-III was composed of fully hardened rapeseed oil as hardstock (2 wt %) and canola rapeseed oil, and showed an N line of N05 = 2,5–3,0; N15 = 2,0–2,5; N25 = 2,0–2,5; N35 = 1,5–2,0. The same fat phase was used for example IV-V, except that in stead of canola rapeseed oil, sunflower oil was used.

TABLE 2 comparative examples, amounts in wt % on total product

| Ingredient | C1 | C2 | C3 | C4 | C5 |
|---|---|---|---|---|---|
| Bolec ZT (UMZ) | 0.1 | | | 0.37 | 0.35 |
| Bolec MT | 0.05 | 0.18 | 0.18 | | |
| Cetinol | 0.5 | 0.1 | 0.1 | | |
| Protein* | | 0.1 | 0.44 | | 0.7 |
| Added monoglycerides** | | | | 0.3 | |
| Salt; NaCl | 1.5 | 1.5 | 1 | 2.5 | 1.5 |
| $N_2$ | | | | | yes |
| Fat phase*** | 82 | 82 | 82 | 65 | 80 |
| Flavour/carotene | 0.032 | 0.032 | 0.032 | 0.032 | 0.032 |
| K-sorbate | 0.073 | 0.073 | 0.073 | 0.073 | 0.073 |
| Citric acid | 0.048 | 0.048 | 0.07 | 0.02 | 0.002 |

Balance to 100 wt % is water.
*Sour whey protein powder comprising about 12 wt % protein and about 63 wt % lactose, the balance to 100% being water and ashes; except for C5 where sweet whey protein was used.
**Dimodan CPT ex Danisco
***Fat phase showed an N line of N05 = 2,5–3,0; N15 = 2,0–2,5; N25 = 2,0–2,5; N35 = 1,5–2,0 and was composed of fully hardened rapeseed oil as hardstock (2 wt %) and as the liquid oil canola rapeseed oil for C1,C2,C3, and sunflower oil for C4,C5.

The results are summarised in table 3.

TABLE 3

Results

| Product | Oil separation (vol %) | Foaming (see below) | Spattering SV1 SV2 | Pourability Bostwick at 15° C. | Browning |
|---|---|---|---|---|---|
| I | 3.7% | a) 93 s<br>b) 7 mm<br>c) 17 s<br>d) 80% | SV1: 9<br>SV2: 6.5 | 14 | no |
| II | 0% | a) 67 s<br>b) 5 mm<br>c) 17 s<br>d) 90% | SV1: 9<br>SV2: 6.5 | 14.5 | no |
| III | 2.2% | a) 95 s<br>b) 7 mm<br>c) 16 s<br>d) 80% | SV1: 8<br>SV2: 6 | 12 | no |
| IV | 2.5% | a) 93 s<br>b) 7 mm<br>c) 10 s<br>d) 80% | SV1: 8.5<br>SV2: 5.5 | 19 | no |
| V | 2.8% | a) 124 s<br>b) 7 mm<br>c) 17 s<br>d) 80% | SV1: 9<br>SV2: 5.5 | 19 | no |
| C1 | 14.8% | a) 64 s<br>b) 9 mm<br>c) 15 s<br>d) 60% | SV1: 9<br>SV2: 6.5 | 13 | no |
| C2 | 7.4% | a) 112 s<br>b) 15 mm<br>c) 7 s<br>d) 35% | SV1: 8<br>SV2: 6 | 14 | yes |
| C3 | 6.0% | a) 126 s<br>b) 15 mm<br>c) 2 s<br>d) 10% | SV1: 9<br>SV2: 5 | 13.5 | yes |
| C4 | 8.9% | a) 90 s<br>b) 7 mm<br>c) 30 s<br>d) 60% | SV1: 9<br>SV2: 7 | 8 | no |
| C5 | 3.7% | a) 67 s<br>b) 7 mm<br>c) 30 s<br>d) 80% | SV1: 10<br>SV2: 5 | 12 | yes |

Nd: not determined
Foaming:
a) Time it takes until foam formation starts
b) Maximum of foam bubble size distribution at maximum foam coverage
c) Time that maximum amount of foam is maintained
d) Quantity of foam at the end of shallow frying It is concluded that products according to the examples show all desired frying characteristics in terms of spattering, foaming, pourability, browning and oil separation.

We claim:

1. Food product with a Bostwick value of at least 7 at 15° C., comprising an aqueous phase and from 40 to 90 wt % of a fat phase on total product, said food product comprising
   a) 0.1 to 1.5 wt % of one or more anti-spattering agents comprising no native soy lecithin or native soy lecithin in an amount of from 0 to 0.05 wt % on total product,
   b) optionally one or more emulsifiers in a total amount of from 0 to 0.5 wt %
   c) optionally one or more browning agents in a total amount of from 0 to 0.07 wt %
   d) one or more salts in an amount of from 0.5 to 3 wt %.

2. Food product according to claim 1 wherein the anti-spattering agent consists of hydrolysed lecithin in an amount of 0.1 to 1 wt %, fractionated lecithin in an amount of 0 to 0.5 wt % and citric acid ester in an amount of 0 to 1.5 wt %.

3. Food product according to claim 2, wherein the anti-spattering agent consists of 0.1 to 1 wt % hydrolysed lecithin and 0.05 to 0.5 wt % fractionated lecithin, wherein the fractionated lecitin is an alcohol soluble lecithin fraction.

4. Food product according to claim 3, wherein the amount of hydrolysed lecithin is from 0.1 to 0.35 wt % and the amount of alcohol soluble lecithin fraction is from 0.05 to 0.2 wt %.

5. Food product according to claim 1 wherein native soy lecithin is essentially absent.

6. Food product according to claim 1, which is essentially free of added emulsifier.

7. Food product according to claim 1, wherein the emulsifier is selected from the group comprising monoglycerides and diglycerides or combinations thereof.

8. Food product according to claim 1 wherein the browning agent is a protein and the level of protein in the product is from 0 to 0.03 wt %.

9. Food product according to claim 1 which shows upon heating an average foam bubble size of between 0.05 and 1.5 cm and a maximum of foam bubble size distribution of from 0.4 to 0.9 cm, and oil separation of from 0 to 5 vol % upon storage at 25° C. for four weeks.

* * * * *